US011323750B2

(12) United States Patent
Li et al.

(10) Patent No.: US 11,323,750 B2
(45) Date of Patent: May 3, 2022

(54) VIDEO SYSTEM AND VIDEO PROCESSING METHOD, DEVICE AND COMPUTER READABLE MEDIUM

(71) Applicant: BEIJING BAIDU NETCOM SCIENCE AND TECHNOLOGY CO., LTD, Beijing (CN)

(72) Inventors: Minglu Li, Beijing (CN); Huifeng Shen, Beijing (CN); Feifei Cao, Beijing (CN); Li You, Beijing (CN); Hongbai Dong, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 115 days.

(21) Appl. No.: 16/731,269

(22) Filed: Dec. 31, 2019

(65) Prior Publication Data
US 2020/0404345 A1 Dec. 24, 2020

(30) Foreign Application Priority Data

Jun. 19, 2019 (CN) .......................... 201910533002.X

(51) Int. Cl.
*H04N 21/222* (2011.01)
*H04N 21/2187* (2011.01)
(Continued)

(52) U.S. Cl.
CPC ....... *H04N 21/222* (2013.01); *H04N 21/2187* (2013.01); *H04N 21/231* (2013.01);
(Continued)

(58) Field of Classification Search
None
See application file for complete search history.

(56) References Cited

U.S. PATENT DOCUMENTS 10,104,427 B1 * 10/2018 Zabetian ............ H04N 21/8133
10,750,236 B2    8/2020 Chen
(Continued)

FOREIGN PATENT DOCUMENTS

CN     102098586 A     6/2011
CN     102752574 A    10/2012
(Continued)

OTHER PUBLICATIONS

Chinese First Office Action from corresponding Chinese Application No. 201910533002.X dated Mar. 1, 2021.
(Continued)

*Primary Examiner* — Omar S Parra
(74) *Attorney, Agent, or Firm* — Lando & Anastasi, LLP

(57) ABSTRACT

A video system, a video processing method, a device and a computer readable medium are disclosed. The system includes: a front-end device and a cloud server; the front-end device is configured to collect video stream data, and set a video identifier and a service scenario identifier for the video stream data, upload the video identifier, the video stream data and the service scenario identifier to the cloud server; the cloud server is configured to generate a video file corresponding to the video identifier according to the service scenario identifier, the video identifier and the video stream data; and store the video file.

16 Claims, 5 Drawing Sheets

(51) Int. Cl.
  *H04N 21/231* (2011.01)
  *H04N 21/239* (2011.01)
  *H04N 21/262* (2011.01)
  *H04N 21/437* (2011.01)
  *H04N 21/482* (2011.01)

(52) U.S. Cl.
  CPC ... *H04N 21/2393* (2013.01); *H04N 21/26258* (2013.01); *H04N 21/437* (2013.01); *H04N 21/4825* (2013.01)

(56) References Cited

U.S. PATENT DOCUMENTS

| | | | |
|---|---|---|---|
| 2011/0280540 A1* | 11/2011 | Woodman | H04N 21/2187 386/201 |
| 2014/0237365 A1* | 8/2014 | Oberbrunner | G06F 3/04847 715/722 |
| 2014/0359680 A1* | 12/2014 | Shivadas | H04N 21/47217 725/90 |
| 2015/0106432 A1 | 4/2015 | Hsieh | |
| 2015/0128162 A1 | 5/2015 | Ionescu | |
| 2020/0045350 A1* | 2/2020 | Hegde | H04N 21/234345 |

FOREIGN PATENT DOCUMENTS

| | | |
|---|---|---|
| CN | 104202673 A | 12/2014 |
| CN | 104378647 A | 2/2015 |
| CN | 104869438 A | 8/2015 |
| CN | 105872581 A | 8/2016 |
| CN | 105915944 A | 8/2016 |
| CN | 106302810 A | 1/2017 |
| CN | 106899577 A | 6/2017 |
| CN | 107249121 A | 10/2017 |
| CN | 107306341 A | 10/2017 |
| CN | 108305513 A | 7/2018 |
| CN | 109615962 A | 4/2019 |
| CN | 109819345 A | 5/2019 |
| JP | 2014241146 A | 12/2014 |
| JP | 2018521601 A | 8/2018 |

OTHER PUBLICATIONS

Chinese Search Report from corresponding Chinese Application No. 201910533002.X dated Feb. 19, 2021.

Japanese First Office Action from corresponding Japanese Application 2020-008258 dated Mar. 16, 2021.

* cited by examiner

US 11,323,750 B2

VIDEO SYSTEM AND VIDEO PROCESSING METHOD, DEVICE AND COMPUTER READABLE MEDIUM

CROSS REFERENCE TO RELATED APPLICATIONS

The present application claims the priority of Chinese Patent Application No. 201910533002.X, filed on Jun. 19, 2019, with the title of "Video system and video processing method, device and computer readable medium". The disclosure of the above applications is incorporated herein by reference in its entirety.

TECHNICAL FIELD

The present disclosure generally relates to the field of computer application technologies, and particularly to a video system, a video processing method, a device and a computer readable medium.

BACKGROUND

With the development of Internet technology, interconnected video-type applications becomes more and more popular. On-demand broadcast, live broadcast and short video take up most of user's leisure time each day. Refreshing videos has already become a new entertainment trend.

In an interconnected mobile video system, with the further development of the mobile networks, mobile devices and cloud services, video production has a new trend of activating a video with a mobile phone camera as a carrier. FIG. 1 is a service scenario diagram of an existing video system. As shown in FIG. 1, the video system may include three parts: a front-end device, a cloud server and a service processing device. The front-end device includes an uploading terminal and/or a consumption terminal, a camera, and an encoding/decoding module; the cloud server includes an uploading Content Delivery Network (CDN) node, a distribution CDN node and a storage node; and the service processing device is used to perform service processing for the video stored in the storage node of the cloud server. A main process is as follows: an uploading terminal, triggered by the user, opens a camera to acquire images, uses an encoding/decoding module to perform encoding processing for data of the acquired images, synthesizes to form a video file, and uploads the video file to the uploading CDN node in the cloud server. The uploading CDN node stores the video file in the storage node. The service processing device obtains the video file from the storage node, performs service processing on the video file, and store the video file processed into the storage node. When a consumption terminal requests for a video from the cloud server, the distribution CDN node obtains a corresponding video file from the storage node according to the request of the consumption terminal, and encapsulates the video file into formatted data, sends the data to the encoding/decoding module in the consumption terminal, the encoding/decoding module decapsulates the data, and then sends the data to the consumption terminal, and the consumption terminal displays the video picture after performing OpenGL processing.

In the above mentioned existing video system, the video processing link of the whole system is long, and causes a large video processing delay.

SUMMARY

The present disclosure discloses a video system, a video processing method, a device and a computer readable medium, which may shorten a video processing link and reduce a delay for video processing.

An embodiment of the present disclosure discloses a video system, which includes: a front-end device and a cloud server;

the front-end device is configured to collect video stream data, and set a video identifier and a corresponding service scenario identifier for the video stream data, upload the video identifier, the video stream data and the service scenario identifier to the cloud server;

the cloud server is configured to generate a video file corresponding to the video identifier according to the service scenario identifier, the video identifier and the video stream data; and store the video file.

An embodiment of the present disclosure discloses a video processing method, which includes:

collecting video stream data;

setting a video identifier and a corresponding service scenario identifier for the video stream data;

uploading the video identifier, the video stream data and the service scenario identifier to a cloud server, so that the cloud server generates a video file corresponding to the video identifier according to the service scenario identifier, the video identifier and the video stream data; and store the video file.

An embodiment of the present disclosure discloses a video processing method, which includes:

receiving a video identifier, video stream data and a service scenario identifier uploaded by a front-end device;

generating a video file corresponding to the video identifier according to the service scenario identifier, the video identifier and the video stream data; and storing the video file.

An embodiment of the present disclosure discloses a front-end device, which includes:

a collecting module configured to collect video stream data;

a configuring module configured to set a video identifier and a corresponding service scenario identifier for the video stream data;

a sending module configured to upload the video identifier, the video stream data and the service scenario identifier to a cloud server, so that the cloud server generates a video file corresponding to the video identifier according to the service scenario identifier, the video identifier and the video stream data, and stores the video file.

An embodiment of the present disclosure discloses a cloud server, which includes an uploading CDN node and a storage node;

the uploading CDN node is configured to receive a video identifier, video stream data and a service scenario identifier uploaded by a front-end device;

the uploading CDN node is further configured to generate a video file corresponding to the video identifier according to the service scenario identifier, the video identifier and the video stream data;

the uploading CDN node is further configured to store the video file in the storage node.

An embodiment of the present disclosure discloses a computer device which includes:

one or more processors, a memory for storing one or more programs, the one or more programs, when executed by said one or more processors, enable said one or more processors to implement the above-mentioned video processing method.

An embodiment of the present disclosure discloses a computer readable medium on which a computer program is stored, the program, when executed by a processor, implementing the above-mentioned video processing method.

According to the video system and video processing method, device and computer readable medium of the present disclosure, it is possible to put the video processing service in trust on the cloud server, instead of performing the video service processing only after the video is stored, thereby enabling the video service processing to be performed as early as possible, making the video processing capability closer to the user, bringing about a quicker processing response, effectively shortening the link for the video processing in the video system, reducing a delay in the video processing, and improving the video processing efficiency. Furthermore, as compared with the prior art, the present disclosure may effectively reduce data link propagation and cut the wideband cost.

Furthermore, in the present disclosure, it is possible to omit an encoding/decoding module in the front-end device, thereby omitting the encoding and decoding process, reducing the abnormity issue caused by the encoding and decoding, allowing the uploading or delivery of the video data to be completed as early as possible, further shortening the link for the video processing, reducing the delay in the video processing, and improving the efficiency of the video processing.

Furthermore, in the technical solutions of the present disclosure, since the encoding and decoding module is omitted, the client of the video system on the side of the front-end device may be simplified, the user needn't perform update, and the user's experience in use may be effectively enhanced.

DETAILED DESCRIPTION OF EMBODIMENTS

Figure 1:
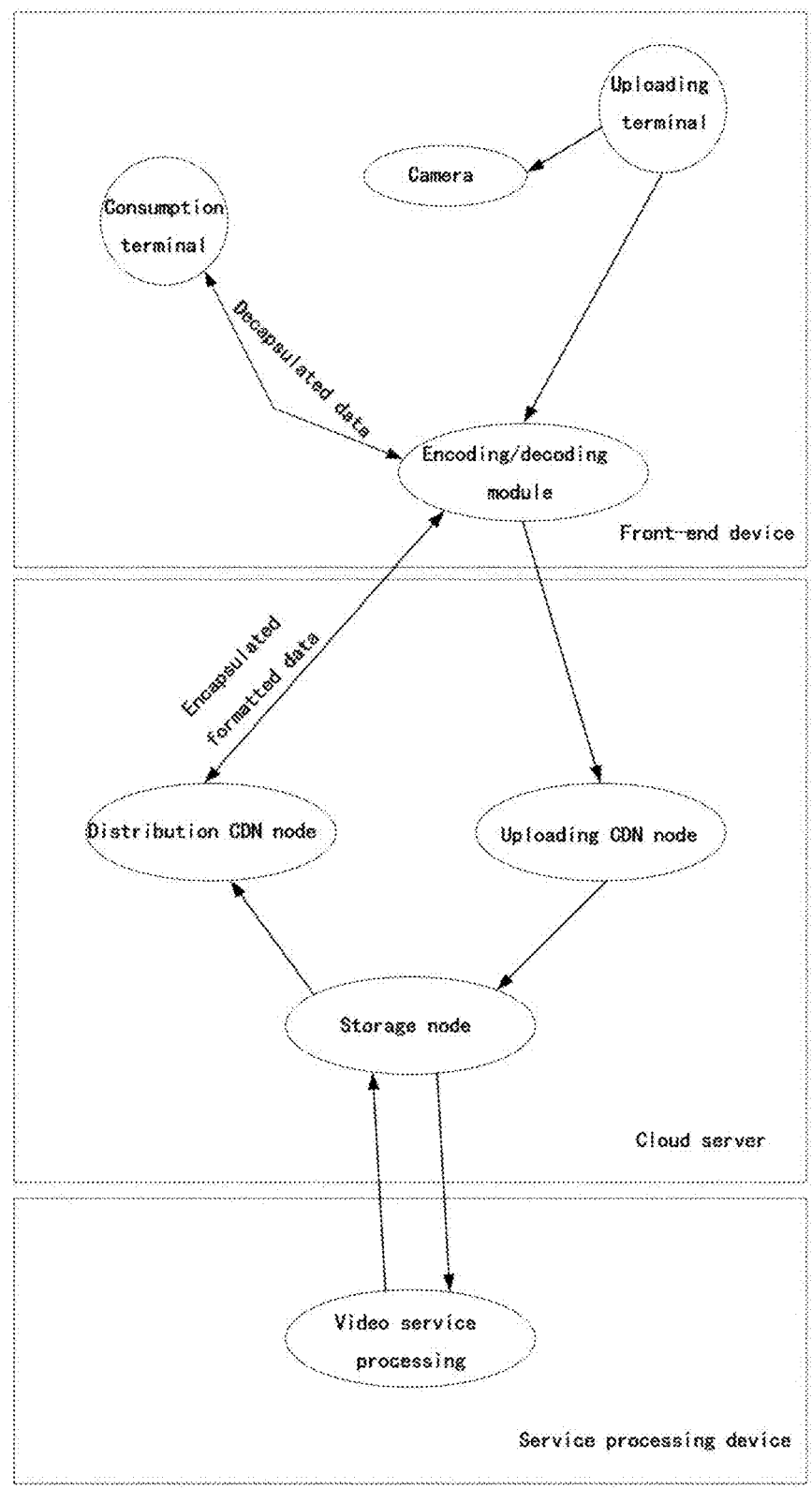
FIG. 1 is a service scenario diagram of an existing conventional video system.

The present disclosure will be described in detail with reference to the drawing and specific embodiments to make objectives, technical solutions and advantages of the present disclosure more apparent.

Figure 2:
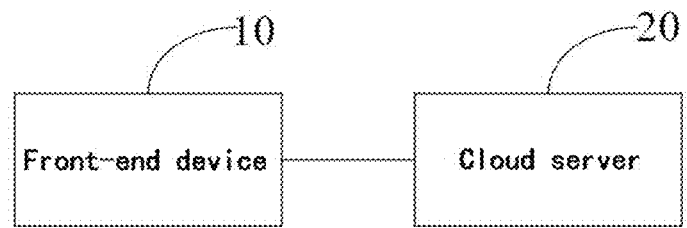
FIG. 2 is a schematic structural diagram of a video system according to an embodiment of the present disclosure.

FIG. 2 is a schematic structural diagram of a video system according to an embodiment of the present disclosure. As shown in FIG. 2, the video system in this embodiment may include a front-end device 10 and a cloud server 20. The front-end device 10 is communicatively connected with the cloud server 20.

The front-end device 10 is configured to collect video stream data, and allocate a video identifier to the video stream data; generate a service scenario identifier of the video stream data, and upload/send the video identifier, the video stream data and the service scenario identifier to the cloud server 20; the video stream data in this embodiment is video data with a certain time duration collected by the front-end device 10.

The video identifier of this embodiment is used to uniquely identify the corresponding video. For example, the video identifier may be a sequence number allocated/set by the front-end device 10 for the video, or other unique identifiers other than the sequence number. The video identifier may employ any one of text, letter or number, or any combination thereof. The service scenario identifier in this embodiment may identify the service scenario in which the front-end device 10 collects the video data. For example, the user who uploads the video may select the service scenario in the front-end device 10 first when he turns on the front-end device 10 to collect the video data. Correspondingly, upon collecting the video stream data in the service scenario, the front-end device 10 sets a corresponding service scenario identifier for the video stream data. Similarly, the service scenario identifier in this embodiment may also employ any one of text, letter or number according to needs, or a combination of at least two thereof. The service scenario identifier in this embodiment may be pre-defined in the front-end device 10 and the cloud server 20, so that the cloud server 20 may recognize the service scenario corresponding to the service scenario identifier uploaded by the front-end device 10.

The cloud server 20 is configured to generate a video file corresponding to the video identifier according to the service scenario identifier, the video identifier and the video stream data uploaded by the front-end device 10; and to store the video file.

Optionally, in practical application, before uploading the video stream data, the front-end device 10 may further receive other video information such as a video name, a video field or a video tag input by the user uploading the video. Correspondingly, the cloud server 20 may store the received information such as the video name, video field or video tag together with the video file.

In the above structural diagram shown in FIG. 2, the technical solution of the present disclosure is described by taking an example in which the video system includes one front-end device 10. In practical application, one cloud server 20 may be communicatively connected with a plurality of front-end devices 10 at the same time.

The above functional depictions of the front-end device 10 and the cloud server 20 occur during the video uploading process in the video system.

Further optionally, after the video uploading is completed, the cloud server 20 is further configured to generate a video list according to the video identifier and the service scenario identifier corresponding to the video file, and send the video list to the log-in front-end device 10; in this embodiment, an example is taken in which the video list includes the video identifier and the service scenario identifier. In the practical application, the video list may also include other video information such as the name of the video and the video tag. Correspondingly, the front-end device 10 is also used to display the video list. In this way, a first user using the front-end device 10 may see the video list. The first user is a consumer user of the video. If the first user wants to view a video corresponding to a certain video identifier in the video list, the front-end device 10 may trigger a video request including the video identifier.

For example, at this time, the front-end device 10 is further configured to receive a video request including the video identifier triggered by the first user according to the video list, and send the video request including the video identifier to the cloud server 20.

The cloud server 20 is further configured to obtain a corresponding video file from the stored video files according to the video identifier in the received video request, and deliver/sending the corresponding video file to the front-end device 10.

The front-end device 10 is further configured to receive and play the video file delivered from the cloud server 20.

The process in which the cloud server 20 delivers the video to the front-end device 10 may be implemented according to the technical solution of the foregoing embodiment.

Figure 3:
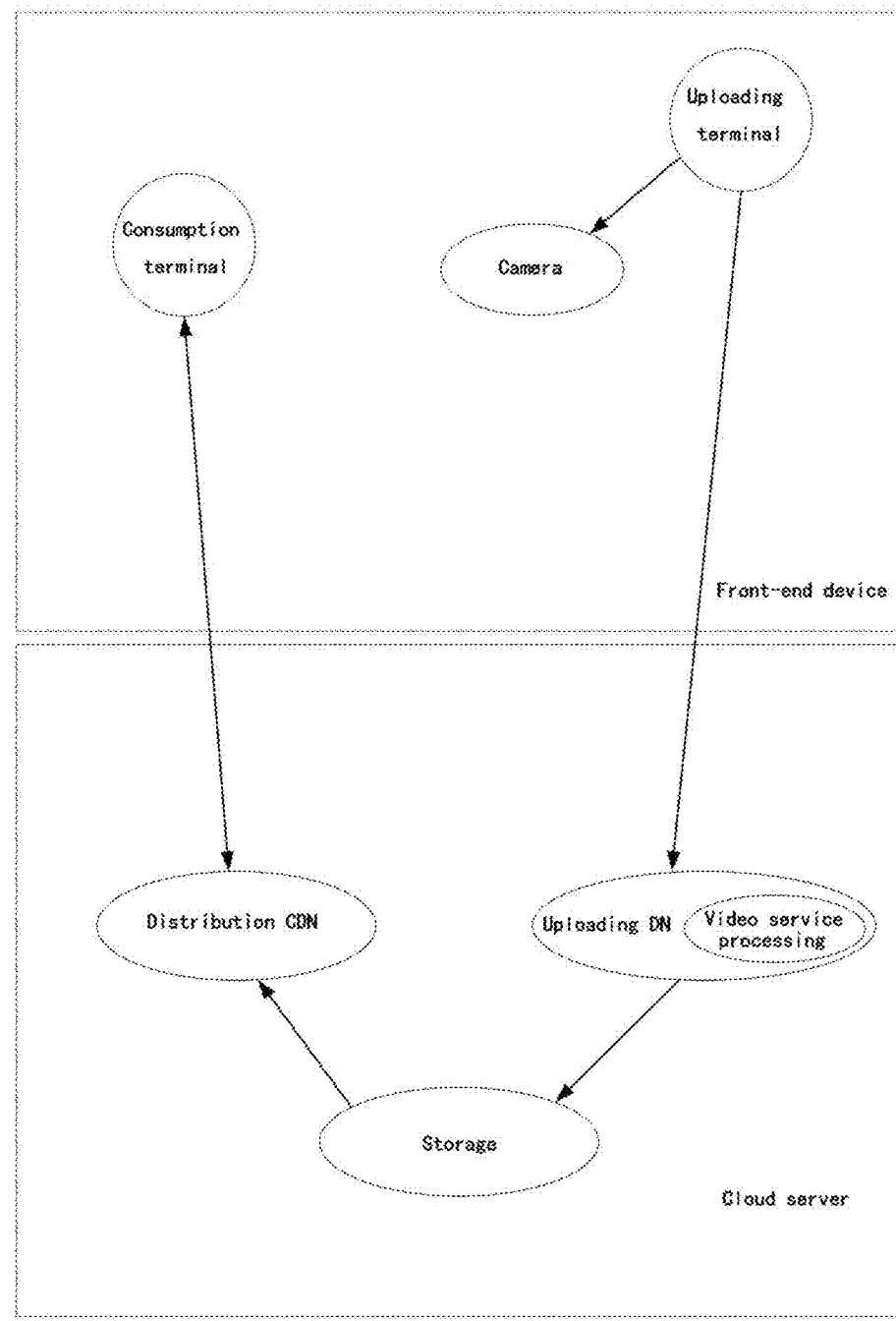
FIG. 3 is a service scenario diagram of the video system shown in FIG. 2.

FIG. 3 is a service scenario diagram of the video system shown in FIG. 2. The front-end device 10 in this embodiment may include an uploading terminal and/or a consumption terminal. An example is taken which the embodiment in FIG. 3 includes both the uploading terminal and the consumption terminal. The uploading terminal is provided with a camera for collecting video stream data. The uploading terminal is a terminal for uploading the video, and the consumption terminal is a terminal for viewing the video. In this embodiment, in an on-demand broadcast scenario and a short video scenario, the uploading terminal and the consumption terminal may be the same terminal entity. The video is first uploaded by the uploading terminal, and then is viewed by the consumption terminal. In the live broadcast scenario, the same terminal may not implement the uploading function and playing function at the same time, and the functions may be performed in different time periods. For example, in a time period, the terminal, as a live broadcaster, may upload the video and realize the live broadcast. In another time period, the terminal, as a live viewer, may download the video and view the live broadcast. The cloud server 20 may include an uploading CDN node, a distribution CDN node and a storage node.

When the video is collected, specifically, a camera in the uploading terminal in the front-end device 10 collects the video stream data, and the uploading terminal sets the video identifier for the collected video stream data, and sets a corresponding service scenario identifier for the video stream data according to the service scenario selected by the second user, and then the uploading terminal uploads the video identifier, the video stream data and the service scenario identifier to the cloud server 20. The second user of this embodiment is a user who uploads the video, that is, a user who produces the video.

For example, when the second user opens the used terminal, for example, an application client of the video system on the uploading terminal and then clicks a video capture button to trigger the camera to capture the video, the uploading terminal may first pop up a service scenario selection box. For example, in this embodiment, the service scenario selection box may display an on-demand broadcast video, a live broadcast video or a short video; the second user selects one of the service scenarios and clicks OK. Correspondingly, the uploading terminal detects the service scenario selected by the second user, and sets a corresponding service scenario identifier for the video stream data according to the service scenario selected by the second user.

At the same time, the camera begins to collect the video stream data. In the case of the on-demand video or short video scenario, the uploading terminal may, after finishing collecting the video stream data, upload all the collected video stream data to the cloud server at one time. In the case of the live broadcast scenario, due to the real-time requirement, the uploading terminal may set a period such as 1 s, 2 s, 3 s or other time periods. Once the video stream data of one period is collected, the uploading terminal will upload the collected video stream data together with the video identifier and the service scenario identifier to the cloud server 20. Certainly, for the on-demand broadcast scenario and short video scenario, the video stream data may also be uploaded to the cloud server 20 in batches.

Correspondingly, the uploading CDN node is configured to generate a video file corresponding to the video identifier according to the service scenario identifier, the video identifier and the video stream data, and store the video file in the storage node.

The distribution CDN node is configured to generate a video list according to the stored video file, the video identifier and the service scenario identifier corresponding to the video file, and send the video list to the log-in consumption terminal. For example, in FIG. 3, one front-end device 10 is taken as an example. At this time, the consumption terminal in the front-end device 10 logs into the video system, the consumption terminal may receive the video list delivered from the distribution CDN node.

Then, the consumption terminal is further configured to display the video list, so that the first user using the consumption terminal may view all the video information in the video list and select the video information that he wants to view. At this time, the first user may trigger the video request through the consumption terminal. For example, if the consumption terminal is a touch screen, the first user may directly click on a piece of video information in the video list, and trigger a video request. Correspondingly, the consumption terminal is further configured to detect and receive a video request including the video identifier triggered by the first user according to the video list, and then send the video request including the video identifier to the cloud server 20.

Correspondingly, the distribution CDN node is further configured to receive the video request including the video identifier which is sent by the consumption terminal, obtain a corresponding video file according to the video identifier in the video request, and deliver the video file to the corresponding consumption terminal.

Finally, the consumption terminal is further configured to receive and play the video file delivered from the cloud server. For example, in this embodiment, after receiving the video file, the consumption terminal first asynchronously uploads queue raw data in the streaming media corresponding to the video file into a texture object via a Central Processing Unit (CPU) and with Open Graphics Library (OpenGL) technology, cascade-processes a mounted frame object via a Graphics Processing Unit (GPU), and finally renders to the consumption terminal. So far, the entire video processing flow from the end to the cloud in the service scenario shown in FIG. 3 is completed.

Figure 4:
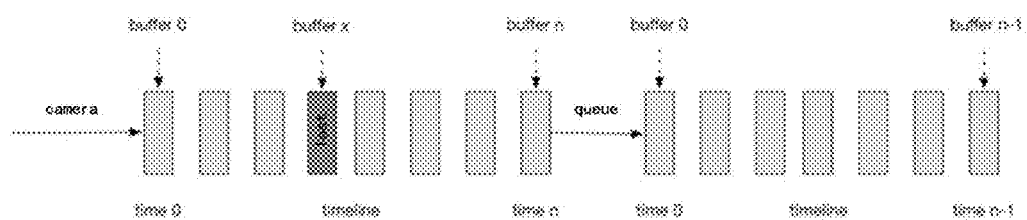
FIG. 4 is a schematic diagram of a scheme for inserting a frame for alignment according to an embodiment of the present disclosure.

Further optionally, the service scenarios in this embodiment may include the following types:

If the service scenario identifier is a live broadcast scenario identifier, the uploading CDN node is configured to detect whether a frame is lost from the video stream data, and if yes, generates the video file corresponding to the video identifier by employing a scheme of inserting a frame for alignment;

In this embodiment, since the camera that collects the video stream data is a hardware device, the collected picture might be made abnormal such as frame loss due to factors like heat generation or defects. At this time, upon the live broadcast, the video might get stuck when the user views the video. In this embodiment, it is feasible to judge whether a frame is lost from the video stream data by detecting timestamps of respective frames of video data in the video stream in turn, and if yes, generate the video file corresponding to the video identifier by employing a scheme of inserting a frame for alignment in this embodiment. Specifically, FIG. 4 is a schematic diagram of a scheme for inserting a frame for alignment according to the present disclosure. As shown in FIG. 4, the camera is used to collect the video stream during a timeline from time0-time n. For each "time", the video data of the frame is collected correspondingly and recorded as a corresponding video data "buffer". If the uploading CDN node detects that the video data buffer x corresponding to the time x is lost from the video stream data, at this time the video data after the frame loss is moved forward by one frame in order to fill the previously lost frame. After completion of such processing, as shown in FIG. 4, the timeline in the overall video stream data is from time0-time n−1, and the corresponding video data only includes buffer 0 to buffer n−1. Moreover, further, in order to ensure the integrity of the video stream data, a trailer video data may be re-added to the video stream data as a buffer n of time n to enhance the user experience. The trailer video data added in this embodiment may be pre-set according to the requirements of the actual scenario. After the processing according to the technical solution of this embodiment, when the live video is viewed at the side of the consumption terminal, the video will not get stuck at the position of the lost frame. However, if the difference of images of the two frames of video data before and after the lost frame is large, fast forward playback might occur.

If the service scenario identifier is an on-demand broadcast scenario, at this time the uploading CDN node is used to detect whether a frame is lost from the video stream data, and if yes, insert a prescribed image frame at a position where the frame is lost, and generates a video file corresponding to the video identifier. The on-demand broadcast scenario does not raise a high requirement for real-time property. If the uploading CDN node detects that a frame is lost from the video stream data, it may insert a prescribed image frame at a position where the frame is lost, and then generates a video file corresponding to the video identifier based on the video data of all frames.

If the service scenario identifier is a short video identifier, the uploading CDN node is configured to detect whether a frame is lost from the video stream data, and if yes, insert a preset scenario frame at the position where the frame is lost to enhance interaction, and generate a video file corresponding to the video identifier. Different from the on-demand broadcast scenario, the time duration of the video in the short video scenario might be shorter, and focus is placed on the interaction with the user. Hence, in the short video scenario, if the uploading CDN node detects that a frame is lost from the video stream data, it may insert a preset scenario frame at the position where the frame is lost to enhance interaction, and generate a video file corresponding to the video identifier based on the video data of all frames.

In the video system of this embodiment, the uploading CDN node in the cloud server 20 may directly perform video service processing, which is equivalent to the video service processing performed in a service processing device in the prior art as shown in FIG. 1. As such, compared with FIG. 1, in this embodiment, the video service processing may be directly performed in the uploading CDN node of the cloud server 20, which is equivalent to putting the video processing service in trust on the uploading CDN node of the cloud server 20, instead of performing the video service processing after the video is stored at the storage node, thereby enabling the video service processing to be performed as early as possible, making the video processing capability closer to the user, bringing about a quicker processing response, effectively shortening the link for the video processing in the video system, reducing a delay in the video processing, and improving the video processing efficiency. Furthermore, as compared with the prior art, the video system according to the present disclosure may effectively reduce data link propagation and reduce the wideband cost.

In addition, compared with the embodiment shown in FIG. 1, in this embodiment, it is possible to directly omit an encoding/decoding module in the front-end device such as the uploading terminal and the consumption device, thereby omitting the encoding and decoding process in the prior art, reducing the abnormity issue caused by the encoding and decoding, allowing the uploading or delivery of the video data to be completed as early as possible, further shortening the link for the video processing, reducing the delay in the video processing, and improving the efficiency of the video processing.

Furthermore, in the prior art, since the encoding/decoding module is provided in the uploading terminal and the consumption terminal, when a chip version level on the hardware of the encoding/decoding module is low and may not be upgraded, the encoding and decoding processing pressure is increased, and the video processing efficiency is low; if the software version of the encoding/decoding module is frequently upgraded, the memory space of the terminal will be consumed, and the burden of the terminal is made too heavy. It is possible to, according to the technical solution of this embodiment, simplify the client of the video system in the uploading terminal and consumption terminal by omitting the encoding/decoding module, not require the user to update, and effectively enhance the user's experience in use.

Figure 5:
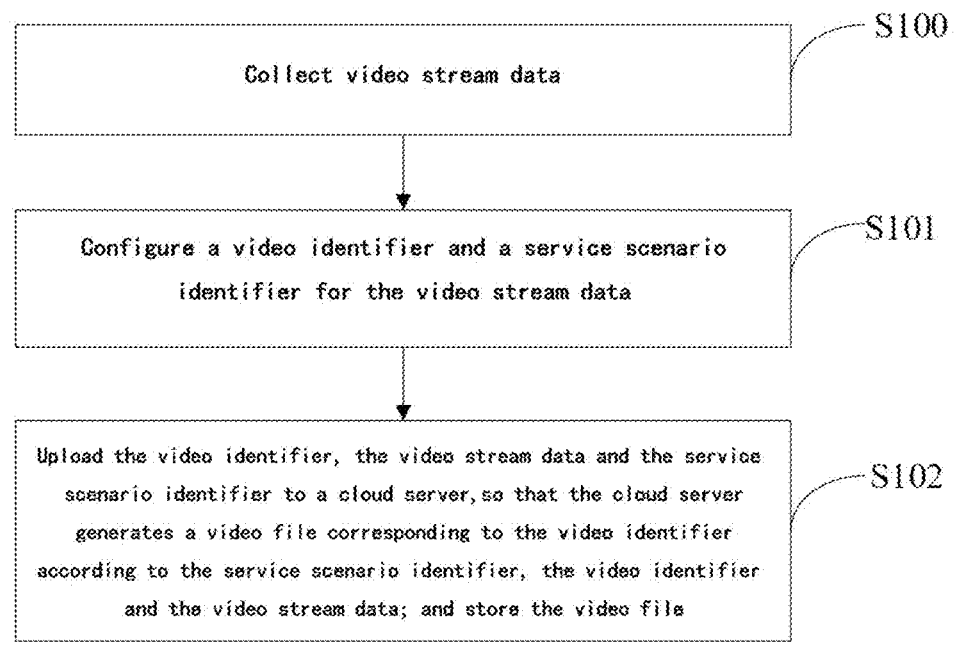
FIG. 5 is a flowchart of a video processing method according to a first embodiment of the present disclosure.

FIG. 5 is a flowchart of a video processing method according to a first embodiment of the present disclosure. As shown in FIG. 5, the video processing method in this embodiment may specifically include the following steps:

S100: collecting video stream data.

S101: configuring a video identifier and a corresponding service scenario identifier for the video stream data.

In this embodiment, the service scenario corresponding to the service scenario identifier in this embodiment may be a live broadcast scenario, an on-demand broadcast scenario or a short video scenario.

S102: uploading the video identifier, the video stream data and the service scenario identifier to a cloud server, so that the cloud server generates a video file corresponding to the video identifier according to the service scenario identifier, the video identifier and the video stream data; and stores the video file.

Specifically, the video processing method in this embodiment is a video processing method based on the video system shown in FIG. 2 to FIG. 3 above. Specifically, the technical solution of the present disclosure is described by performing the video processing method including steps S100-S102 in this embodiment on the side of the front-end device. For example, the uploading of the video may be implemented by the uploading terminal on the side of the front-end device by performing the above steps S100-S102. A specific implementation process will not be detailed any more here and reference may be made to the relevant depictions of the embodiments shown in FIG. 2 and FIG. 3.

Further optionally, on the basis of the technical solution of the embodiment shown in FIG. 5, after the step S102 uploading the video identifier, the video stream data and the service scenario identifier to the cloud server, the method may further include the following steps:

(a1) receiving a video list sent by the cloud server, wherein the video list is generated by the cloud server according to the video identifier of the stored video file and the corresponding service scenario identifier;

(b1) displaying the video list.

It is to be noted that for the on-demand broadcast scenario and the short video scenario, after the front-end device of this embodiment uploads the video as the uploading terminal, the front-end device may also view the on demand broadcast video or short video as the consumption terminal. As for the live broadcast scenario, upon broadcasting the video live as the uploading terminal, the front-end device may not view the live broadcast video as the consumption terminal. However, the front-end device may view live broadcast video of other uploading terminals as the consumption terminal in other time periods. The steps S100-S102 of the embodiment shown in FIG. 5 are the process of uploading the video by the uploading terminal, and may also apply to the on-demand broadcast scenario, the live broadcast scenario and the short video scenario.

And steps (a1)-(b1) are a process of receiving and displaying the video list when the front-end device is the consumption terminal.

Further optionally, after displaying the video list in step (b1), the method may further include the following steps:

(a2) receiving a video request including a video identifier triggered by the first user according to the video list;

(b2) sending the video request including the video identifier to the cloud server;

(c2) receiving and playing the video file delivered from the cloud server.

Similarly, steps (a2)-(c2) are also a process of requesting for the video and playing the video when the front-end device is the consumption terminal. The first user may be a user using the consumption terminal. In addition, optionally, the configuring the corresponding service scenario identifier for the video stream data in the embodiment shown in the above FIG. 5 may be: configuring a corresponding service scenario for the video stream data according to a service scenario selected by a second user located on the side of the uploading terminal. The second user may be a user using the uploading terminal.

The video processing method of the above embodiment will not be detailed any more here and reference may be made to the relevant depictions of the embodiments shown in FIG. 2 and FIG. 3.

According to the video processing method stated in the above technical solution, it is possible to, during video processing, omit the encoding and decoding process, allow the uploading or delivery of the video data to be completed as early as possible, further shorten the link for the video processing, reduce the delay in the video processing and improve the efficiency of the video processing.

Furthermore, according to the video processing method of this embodiment, since the encoding and decoding process is not needed, the client of the video system on the side of the terminal may be simplified, the user needn't perform update, and the user's experience in use may be effectively enhanced.

Figure 6:
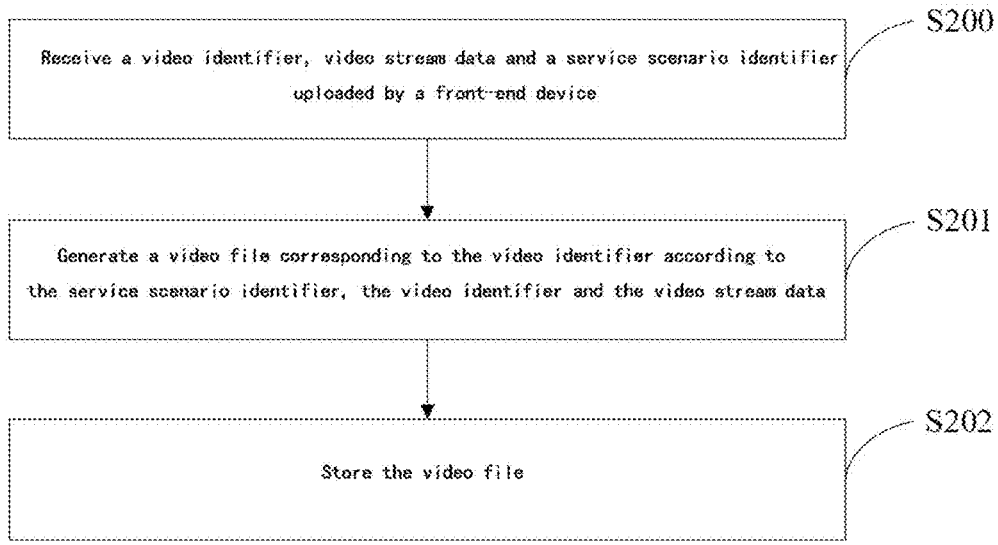
FIG. 6 is a flowchart of a video processing method according to a second embodiment of the present disclosure.

FIG. 6 is a flowchart of a video processing method according to a second embodiment of the present disclosure. As shown in FIG. 6, the video processing method in this embodiment may specifically include the following steps:

S200: receiving a video identifier, video stream data and a service scenario identifier uploaded by a front-end device;

S201: generating a video file corresponding to the video identifier according to the service scenario identifier, the video identifier and the video stream data; and S202: storing the video file.

For example, the step S201 generating a video file corresponding to the video identifier according to the service scenario identifier, the video identifier and the video stream data may include the following cases:

The first case: if the service scenario identifier is a live broadcast scenario identifier, detect whether a frame is lost from the video stream data, and if yes, generate the video file corresponding to the video identifier by employing a scheme of inserting a frame for alignment;

The second case: if the service scenario identifier is an on-demand broadcast scenario, detect whether a frame is lost from the video stream data, and if yes, insert a prescribed image frame at a position where the frame is lost, and generate a video file corresponding to the video identifier;

The third case: if the service scenario identifier is a short video identifier, detect whether a frame is lost from the video stream data, and if yes, insert a preset scenario frame at the position where the frame is lost to enhance interaction, and generate a video file corresponding to the video identifier.

Likewise, the video processing method in this embodiment is a video processing method based on the video system shown in FIG. 2 to FIG. 3 above. Specifically, the technical solution of the present disclosure is described by performing the video processing method including steps S200-S202 in this embodiment on the side of the cloud server. A specific implementation process will not be detailed any more here and reference may be made to the relevant depictions of the embodiments shown in FIG. 2 and FIG. 3.

Further optionally, after the step S202 storing the video file, the method may further include the following steps:

(a3) generating a video list according to the video identifier of the stored video file and the corresponding service scenario identifier; and (b3) sending a video list to the log-in front-end device so that the front-end device displays the video list.

Further optionally, after step (b3) sending a video list to the log-in front-end device, the method may further include the following steps:

(a4) receiving a video request including the video identifier sent by the front-end device; the video request is triggered by the first user according to the video list and is received by the front-end device;

(b4) obtaining a corresponding video file according to the video identifier in the video request; and (c4) delivering the video file to the front-end device so that the front-end device receives and plays the video file.

The video processing method of the above embodiment will not be detailed any more here and reference may be made to the relevant depictions of the embodiments shown in FIG. 2 and FIG. 3.

According to the video processing method stated in the above technical solution, it is possible to put the video processing service in trust on the cloud server, instead of performing the video service processing only after the video is stored, thereby enabling the video service processing to be performed as early as possible, making the video processing capability closer to the user, bringing about a quicker processing response, effectively shortening the link for the video processing in the video system, reducing a delay in the video processing, and improving the video processing efficiency. Furthermore, as compared with the prior art, the video processing method according to the present disclosure may effectively reduce data link propagation and reduce the wideband cost.

According to the video processing method stated in the above technical solution, it is possible to, during video processing, omit the encoding and decoding process, allow the uploading or delivery of the video data to be completed as early as possible, further shorten the link for the video processing, reduce the delay in the video processing and improve the efficiency of the video processing.

Furthermore, according to the video processing method in this embodiment, since the encoding and decoding process is not needed, the client of the video system on the side of the terminal may be simplified, the user needn't perform update, and the user's experience in use may be effectively enhanced.

Figure 7:
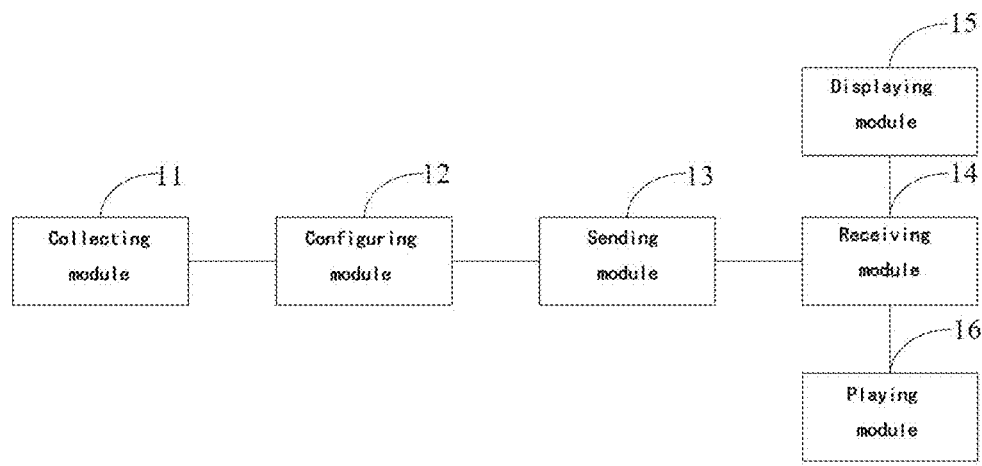
FIG. 7 is a structural diagram of a front-end device according to an embodiment of the present disclosure.

FIG. 7 is a structural diagram of an embodiment of a front-end device according to the present disclosure. As shown in FIG. 7, the front-end device in this embodiment includes:

a collecting module 11 configured to collect video stream data;

a configuring module 12 configured to set a video identifier and a corresponding service scenario identifier for the video stream data collected by the collecting module 11; and a sending module 13 configured to upload the video stream data collected by the collecting module 11, the video identifier and the service scenario identifier configured by the configuring module 12 to a cloud server, so that the cloud server generates a video file corresponding to the video identifier according to the service scenario identifier, the video identifier and the video stream data; and stores the video file.

Further optionally, as shown in FIG. 7, the front-end device in this embodiment further includes:

a receiving module 14 configured to receive a video list sent by the cloud server, the video list being generated by the cloud server according to the video identifier of the stored video file and the corresponding service scenario identifier; and a displaying module 15 configured to display the video list received by the receiving module 14.

Further optionally, as shown in FIG. 7, the front-end device in this embodiment further includes a playing module 16.

The receiving module 14 is further configured to receive a video request including the video identifier triggered by the first user according to the video list;

the sending module 13 is further configured to send the video request including the video identifier which is received by the receiving module 14 to the cloud server;

correspondingly, the receiving module 14 is further configured to receive the video file delivered from the cloud server; and the playing module 16 is configured to play the video file received by the receiving module 14 and delivered from the cloud server.

Principles employed by the front-end device according to this embodiment to implement the video processing by employing the above modules and the resultant technical effects are the same as those of the above-mentioned method embodiments. For particulars, please refer to the depictions of the aforesaid relevant method embodiments, and no detailed depictions will be presented here.

Figure 8:
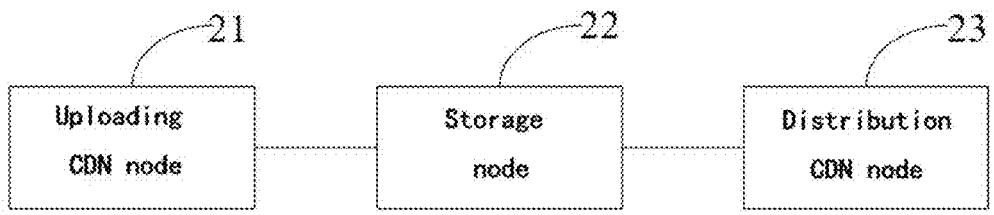
FIG. 8 is a structural diagram of a cloud server according to an embodiment of the present disclosure.

FIG. 8 is a structural diagram of a cloud server according to an embodiment of the present disclosure. As shown in FIG. 8, the cloud server in this embodiment includes:

an uploading CDN node 21 configured to receive a video identifier, video stream data and a service scenario identifier uploaded by a front-end device;

the uploading CDN node 21 configured to generate a video file corresponding to the video identifier according to the service scenario identifier, the video identifier and the video stream data;

the uploading CDN node 21 further configured to store the generated video file in the storage node 22.

Furthermore optionally, as shown in FIG. 8, the cloud server in this embodiment further includes a distribution CDN node 23;

the distribution CDN node 23 is configured to generate a video list according to the video identifier of the video file stored by the storage node 22 and the corresponding service scenario identifier; and send the video list to the log-in front-end device so that the front-end device displays the video list;

furthermore, the distribution CDN node 23 is further configured to receive a video request including the video identifier which is sent by the front-end device; the video request is triggered by the first user according to the video list and received by the front-end device;

the distribution CDN node 23 is further configured to obtain a corresponding video file from the storage node 22 according to the video identifier in the video request;

the distribution CDN node 23 is further configured to deliver the video file to the front-end device so that the front-end device receives and plays the video file.

Further optionally, the uploading CDN node 21 is specifically configured to:

if the service scenario identifier is a live broadcast scenario identifier, detect whether a frame is lost from the video stream data, and if yes, generate the video file corresponding to the video identifier by employing a scheme of inserting a frame for alignment;

if the service scenario identifier is an on-demand broadcast scenario, detect whether a frame is lost from the video stream data, and if yes, insert a prescribed image frame at a position where the frame is lost, and generate the video file corresponding to the video identifier;

if the service scenario identifier is a short video identifier, detect whether a frame is lost from the video stream data, and if yes, insert a preset scenario frame at the position where the frame is lost to enhance interaction, and generate the video file corresponding to the video identifier.

Principles employed by the cloud server according to this embodiment to implement the video processing by employing the above modules and the resultant technical effects are the same as those of the above-mentioned method embodiments. For particulars, please refer to the depictions of the aforesaid relevant method embodiments, and no detailed depictions will be presented here.

Figure 9:
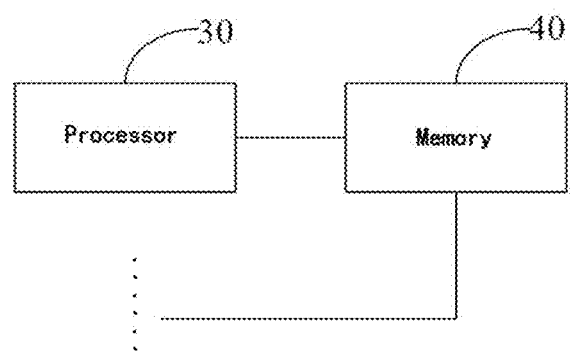
FIG. 9 is a block diagram of an embodiment of a computer device according to the present disclosure.

FIG. 9 is a block diagram of an embodiment of a computer device according to the present disclosure. As shown in FIG. 9, the computer device according to this embodiment includes: one or more processors 30, and a memory 40 for storing one or more programs; the one or more programs stored in the memory 40, when executed by said one or more processors 30, enable said one or more processors 30 to implement the video processing method of the embodiments shown in FIG. 5-FIG. 6. The embodiment of FIG. 9 takes an example in which the computer device includes a plurality of processors 30. The computer device in this embodiment may be the front-end device used to implement the video processing method of the embodiment shown in FIG. 5; the computer device may also be a cloud server used to implement the video processing method of the embodiment shown in FIG. 6.

Figure 10:
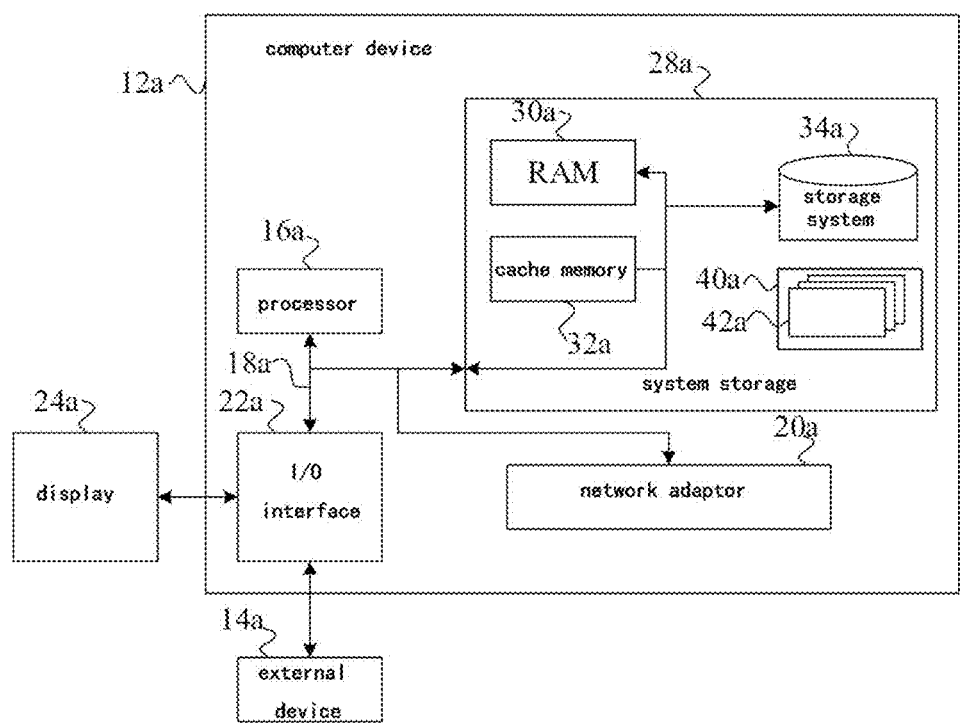
FIG. 10 is a diagram of an example of a computer device according to the present disclosure.

For example, FIG. 10 is an example diagram of a computer device according to an embodiment of the present disclosure. FIG. 10 shows a block diagram of an example computer device 12a adapted to implement an implementation mode of the present disclosure. The computer device 12a shown in FIG. 10 is only an example and should not bring about any limitation to the function and scope of use of the embodiments of the present disclosure.

As shown in FIG. 10, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a may include computer system readable media in the form of volatile memory, such as random access memory (RAM) 30a and/or cache memory 32a. Computer device 12a may further include other removable/non-removable, volatile/non-volatile computer system storage media. By way of example only, storage system 34a may be provided for reading from and writing to a non-removable, non-volatile magnetic media (not shown in FIG. 10 and typically called a "hard drive"). Although not shown in FIG. 10, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 18a by one or more data media interfaces. The system memory 28a may include at least one program product having a set (e.g., at least one) of program modules that are configured to carry out the functions of embodiments shown in FIG. 2-FIG. 6 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 2-FIG. 6 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication may occur via Input/Output (I/O) interfaces 22a. Still yet, computer device 12a may communicate with one or more networks such as a local area network (LAN), a general wide area network (WAN), and/or a public network (e.g., the Internet) via network adapter 20a. As depicted in FIG. 10, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the video processing method shown in the above embodiments.

The present disclosure further provides a computer readable medium on which a computer program is stored, the program, when executed by a processor, implementing the video processing method shown in the above embodiments.

The computer readable medium in this embodiment may include RAM 30a, and/or cache memory 32a and/or a storage system 34a in the system memory 28a in the embodiment shown in FIG. 10.

As science and technology develops, a propagation channel of the computer program is no longer limited to tangible medium, and it may also be directly downloaded from the network or obtained in other manners. Therefore, the computer readable medium in this embodiment may include a tangible medium as well as an intangible medium.

The computer-readable medium in this embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A video system, comprising:
    a first front-end device configured to collect video stream data, and set a video identifier and a service scenario identifier for the video stream data; and
    a cloud server configured to receive the video stream data, the video identifier, and the service scenario identifier sent from the first front-end device; generate a video file corresponding to the video identifier according to the video stream data, the video identifier and the service scenario identifier; and store the video file,
    wherein the video stream data sent from the first front-end device to the cloud server is primary data which is not encoded.

2. The video system according to claim 1, further comprising a second front-end device, wherein the cloud server is further configured to generate a video list according to the video identifier and the service scenario identifier corresponding to the video file stored in the cloud server; and send the video list to the second front-end device; and
    the second front-end device is configured to display the video list.

3. The video system according to claim 2, wherein the second front-end device is further configured to receive a video request including the video identifier triggered by a first user according to the video list, and send the video request including the video identifier to the cloud server;
    the cloud server is further configured to obtain the video file corresponding to the video identifier included in the video request, and send the video file to the second front-end device;
    the second front-end device is further configured to receive and play the video file sent from the cloud server.

4. The video system according to claim 3, wherein the first front-end device comprises an uploading terminal; and the second front-end device comprises a consumption terminal.

5. The video system according to claim 3, wherein the first front-end device and the second front-end device is a same front-end device.

6. The video system according to claim 3, wherein the video file sent from the cloud server to the second front-end device is primary data which is not encapsulated.

7. The video system according to claim 3, wherein the cloud server comprises:
    an uploading CDN node configured to generate the video file corresponding to the video identifier according to the video stream data, the video identifier and the service scenario identifier;
    a storage node configured to store the video file generated by the uploading CDN node; and
    a distribution CDN node configured to generate a video list according to the video identifier and the service scenario identifier corresponding to the video file stored in the storage node; send the video list to the second front-end device; receive the video request including the video identifier sent from the second front-end device; obtain the video file corresponding to the video identifier included in the video request; and send the video file to the second front-end device.

8. The video system according to claim 7, wherein the uploading CDN node is further configured to:
    if the service scenario identifier is a live broadcast scenario identifier, and a frame is detected to be lost from the video stream data, generate the video file corresponding to the video identifier by employing a scheme of inserting a frame for alignment;

if the service scenario identifier is an on-demand broadcast scenario, and a frame is detected to be lost from the video stream data, insert a prescribed image frame at a position where the frame is lost, and generate the video file corresponding to the video identifier;

if the service scenario identifier is a short video identifier, and a frame is detected to be lost from the video stream data, insert a preset scenario frame at the position where the frame is lost to enhance interaction, and generate the video file corresponding to the video identifier.

9. A front-end device, comprising:
a camera;
at least one processor; and
a memory connected with the at least one processor communicatively;
wherein the memory stores instructions executable by the at least one processor to enable the at least one processor to carry out a method which comprises:
collecting video stream data by the camera;
setting a video identifier and a service scenario identifier for the video stream data; and
sending the video stream data, the video identifier, and the service scenario identifier to a cloud server,
wherein the video stream data sent to the cloud server is primary data which is not encoded.

10. The front-end device according to claim 9, wherein the method further comprises:
receiving a video list sent from the cloud server, the video list including the video identifier and the service scenario identifier; and
displaying the video list.

11. The front-end device according to claim 10, wherein the method further comprises:
receiving a video request including the video identifier triggered by a first user according to the video list;
sending the video request including the video identifier to the cloud server;
receiving the video file corresponding to the video identifier included in the video request sent from the cloud server; and
playing the video file received from the cloud server.

12. The front-end device according to claim 11, wherein the video file received from the cloud server is primary data which is not encapsulated.

13. A cloud server, comprising:
an uploading CDN node configured to receive video stream data, and a video identifier and a service scenario identifier corresponding to the video stream data, from a first front-end device; generate a video file corresponding to the video identifier according to video stream data, the video identifier and the service scenario identifier;
a storage node configured to store the video file generated by the uploading CDN node,
wherein the video stream data received by the uploading CDN node from the first front-end device is primary data which is not encoded.

14. The cloud server according to claim 13, further comprising:
a distribution CDN node configured to generate a video list according to the video identifier and the service scenario identifier corresponding to the video file stored in the storage node; send the video list to a second front-end device; receive a video request including the video identifier sent from the second front-end device; obtain the video file corresponding to the video identifier included in the video request; and sending the video file to the second front-end device.

15. The cloud server according to claim 14, wherein the video file sent from the distribution CDN node to the second front-end device is primary data which is not encapsulated.

16. The cloud server according to claim 14, wherein the uploading CDN node is further configured to:
if the service scenario identifier is a live broadcast scenario identifier, and a frame is detected to be lost from the video stream data, generate the video file corresponding to the video identifier by employing a scheme of inserting a frame for alignment;
if the service scenario identifier is an on-demand broadcast scenario, and a frame is detected to be lost from the video stream data, insert a prescribed image frame at a position where the frame is lost, and generate the video file corresponding to the video identifier;
if the service scenario identifier is a short video identifier, and a frame is detected to be lost from the video stream data, insert a preset scenario frame at the position where the frame is lost to enhance interaction, and generate the video file corresponding to the video identifier.

* * * * *